(12) United States Patent
Trivedi

(10) Patent No.: US 6,712,970 B1
(45) Date of Patent: Mar. 30, 2004

(54) SEWAGE TREATMENT PROCESS WITH PHOSPHORUS REMOVAL

(75) Inventor: Hiren K. Trivedi, Cedar Park, TX (US)

(73) Assignee: Enviroquip, Inc., Austin, TX (US)

( * ) Notice: Subject to any disclaimer, the term of this patent is extended or adjusted under 35 U.S.C. 154(b) by 0 days.

(21) Appl. No.: 10/331,270

(22) Filed: Dec. 30, 2002

Related U.S. Application Data

(63) Continuation-in-part of application No. 10/043,938, filed on Jan. 11, 2002, now abandoned.

(51) Int. Cl.⁷ .................................................. C02F 3/30
(52) U.S. Cl. ...................... 210/605; 210/614; 210/623; 210/626; 210/630; 210/903; 210/906
(58) Field of Search .............................. 210/605, 614, 210/620, 621, 623, 626, 630, 903, 906

(56) References Cited

U.S. PATENT DOCUMENTS

| | | | | |
|---|---|---|---|---|
| 3,709,346 A | * | 1/1973 | Peterson et al. ........... 193/35 C |
| 3,733,264 A | * | 5/1973 | Spector et al. ............... 210/604 |
| 3,864,246 A | * | 2/1975 | Casey et al. ................ 210/627 |
| 3,964,998 A | * | 6/1976 | Barnard ....................... 210/605 |
| 3,966,965 A | * | 6/1976 | Sellstedt et al. ............ 514/510 |
| 3,994,802 A | * | 11/1976 | Casey et al. ................ 210/605 |
| 4,051,039 A | * | 9/1977 | Heaney ....................... 210/274 |
| 4,056,465 A | * | 11/1977 | Spector ....................... 210/605 |
| 4,141,822 A | * | 2/1979 | Levin et al. ................ 210/625 |
| 4,159,945 A | * | 7/1979 | Savage ........................ 210/618 |
| 4,162,153 A | * | 7/1979 | Spector ......................... 71/12 |
| 4,183,808 A | * | 1/1980 | Drnevich ..................... 210/622 |
| 4,257,897 A | * | 3/1981 | Krichten et al. ............. 210/605 |
| 4,271,026 A | * | 6/1981 | Chen et al. ................. 210/605 |
| 4,402,493 A | * | 9/1983 | Tsuge ....................... 267/64.21 |
| 4,488,967 A | * | 12/1984 | Block et al. ................. 210/605 |
| 4,488,968 A | * | 12/1984 | Hong et al. ................. 210/605 |
| 4,522,663 A | * | 6/1985 | Ovshinsky et al. .......... 148/403 |
| 4,522,722 A | * | 6/1985 | Nicholas ..................... 210/605 |
| 4,556,491 A | * | 12/1985 | Spector et al. .............. 210/608 |
| 4,650,585 A | * | 3/1987 | Hong et al. ................. 210/605 |
| 4,655,925 A | * | 4/1987 | Tabata et al. ................ 210/605 |
| 4,867,883 A | * | 9/1989 | Daigger et al. .............. 210/605 |
| 4,874,519 A | * | 10/1989 | Williamson ................. 210/605 |
| 4,956,094 A | * | 9/1990 | Levin et al. ................. 210/625 |
| 5,076,928 A | * | 12/1991 | Ballnus ....................... 210/605 |
| 5,342,522 A | * | 8/1994 | Marsman et al. ........... 210/605 |
| 5,480,548 A | * | 1/1996 | Daigger et al. ............. 210/605 |
| 5,906,746 A | * | 5/1999 | Helmo et al. ................ 210/614 |
| 6,039,873 A | * | 3/2000 | Stahler ........................ 210/605 |
| 6,312,599 B1 | * | 11/2001 | Reid ............................ 210/605 |

* cited by examiner

Primary Examiner—Fred G. Prince
(74) Attorney, Agent, or Firm—Thomas M. Freiburger

(57) ABSTRACT

In the liquid side of sewage treatment process, a combination aerobic/anoxic stage is closely monitored such that phosphorus can be removed as well as nitrogen. As in a known process, the aerobic/anoxic stage is monitored as to a coenzyme of the active bacteria. When the bacteria of flocs within this stage show a switch to anaerobic condition via such coenzyme, the low dissolved oxygen level in the stage is maintained for a preselected period of time or to a preselected extent of the anaerobic condition, before oxygen is added. This somewhat brief anaerobic condition within the flocs is sufficient to release significant amounts of phosphorus into the liquid. When aeration then is increased, enhanced biological phosphorus uptake is effected. A small aerobic stage is included after the aerobic/anoxic stage to ensure maximum phosphorus uptake, and in one embodiment this stage includes a membrane separator, allowing downstream secondary clarification to be eliminated.

15 Claims, 3 Drawing Sheets

SEWAGE TREATMENT PROCESS WITH PHOSPHORUS REMOVAL

This application is a continuation-in-part of patent application Ser. No. 10/043,938, filed Jan. 11, 2002, now abandoned.

BACKGROUND OF THE INVENTION

This invention concerns sewage treatment, and especially relates to an enhancement in a particular process used in the liquid side of a wastewater treatment plant.

Sewage treatment plants in some locations and applications are required to remove phosphorus from the influent waste stream, to meet a maximum effluent standard for phosphorus (phosphorus as used herein is intended to include compounds of phosphorus as typically present in wastewater). This is in addition to nitrogen removal requirements. One conventional liquid-side process for removing both nitrogen and phosphorus would include an anaerobic stage followed by an anoxic stage, and then an aerobic stage. Recycling of a portion of the mixed liquor would occur from the aerobic stage back to the anoxic stage, and also from the anoxic stage back to the anaerobic stage to maintain bacterial population there. In this way, phosphorus can be released in the anaerobic stage, into the wastewater; and in the anoxic stage, nitrogen gas is released as microbes obtain oxygen from nitrates. In the aerobic stage, nitrification occurs and biological phosphorus uptake is promoted by the aerobic conditions. The recycling returns nitrates to the to the anoxic stage for nitrogen release and maintains bacterial population in the anaerobic stage. Typically, sludge is also recycled from the solids side of the plant, i.e. from secondary clarification, back to the anoxic stage. This recycle loop is for the purpose of retaining biomass in the system.

A relatively new liquid-side process has been used recently, known as the SymBio treatment process licensed by BioBalance of Denmark. The SymBio process conserves on tank volume by providing a combined aerobic/anoxic stage in which both nitrification and denitrification occur. This process, however, does not address phosphorus removal.

In the SymBio process, which is a continuous flow process, both aerobic and anoxic conditions exist in a single stage, within a single tank. Dissolved oxygen content is very limited, generally kept in a range below about 1 ppm by regulating aeration between a minimum and higher rates as needed for the process. A metabolic coenzyme of the bacteria in the aerobic/anoxic stage is monitored using ultraviolet light. The detectable coenzyme condition occurs when the microbes start to go anaerobic, which typically happens in the middle of a floc, even when outer regions of the same floc are aerobic or at least anoxic (in the anoxic condition nitrates are available to provide oxygen to the microbes). Dissolved oxygen is increased, as by aeration, when this anaerobic condition occurs, preventing the entire stage from becoming anaerobic. The development of the anaerobic condition can also be detected using chemical measurements of ammonium, phosphate, nitrates and volatile fatty acid concentration, measurement of redox potential, pH, alkalinity short-term measurements of BOD, COD, measurement of $CO_2$ concentration, measurement of fluorescence emission from at least one characteristic biogenic fluorophore selected from the group consisting of NADH, NAD(P)H, tryptophan—and tyrosine-containing proteins, tryptophan— and tyrosine-containing peptides, tryptophan—and tyrosine-containing derivatives of amino acids, purines, pyrimidines, nucleosides, nucleotides, nucleic acids, steroids and vitamins, and combination thereof. The SymBio process is described in U.S. Pat. No. 5,906,746, incorporated herein by reference.

It is an object of this invention to modify the SymBio process to effect significant phosphorus removal, thus meeting effluent requirements in most cases for both nitrogen and phosphorus.

The following U.S. patents are believed to have background relevance to this invention: U.S. Pat. Nos. 4,159,945, 4,051,039, 3,709,346, 3,964,998, 3,733,264, 3,864,246, 3,994,802, 4,056,465, 4,162,153, 4,257,897, 4,271,026, 4,488,967, 4,488,968, 4,522,722, 4,522,663, 4,556,491, 4,650,585, 4,867,883, 4,402,493, 4,141,822, 4,183,808, 4,956,094, 4,874,519, and 3,966,965.

SUMMARY OF THE INVENTION

Under the present invention, it was noticed in operating the SymBio liquid side treatment process that when the microbes toward the middle of flocs in the aerobic/anoxic stage start to turn to the anaerobic condition, if this condition is allowed to persist for a sufficient time, this will provide a sufficient anaerobic condition in the treated liquid and bacteria to cause release of significant quantities of phosphorus into the liquid. The subsequent addition of dissolved oxygen in this stage will promote the desired biological phosphorus uptake. However, without a subsequent aerobic stage beyond the anoxic/aerobic stage, it was discovered, the biological phosphorus uptake will not be maximized and much of the released phosphorus will remain in the wastewater and in the plant effluent.

In accordance with the invention, the aerobic/anoxic stage as described above is closely monitored, and when microbes toward the center of flocs start to turn to the anaerobic condition, this is allowed to persist and develop for a preselected period of time, such as approximately five minutes, before the dissolved oxygen content is increased. This preselected time duration is chosen to balance the desire for development and maintenance of an anaerobic condition within the floc, for as much phosphorus release as possible, against the need to avoid a more widespread anaerobic condition within the stage, which will cause release of malodorous gases.

In addition, a small aerobic stage is added downstream of the aerobic/anoxic stage, provided to maximize the biological phosphorus uptake by the bacteria. As noted above, the re-aeration that occurs in the aerobic/anoxic stage will cause at least some of the microbes to take up phosphorus, but this effect is only partial in the absence of a further aerobic stage.

In the aerobic/anoxic stage according to the invention, dissolved oxygen level is maintained preferably in the range of about 0.01 to 0.99 ppm. In the subsequent aerobic stage, dissolved oxygen is maintained preferably between about 0.5 and 5.0 ppm.

In a variation of the invention, the small aerobic stage includes a membrane separator which efficiently removes nearly pure water from the solids in the aerobic stage. This can be a substitute for a clarifier downstream, with the removed water leaving the plant. The aeration in the tank with the membranes provides agitation which prevents clogging of the membranes.

As a result of the innovations described above, phosphorus removal can be achieved in the liquid side of a wastewater treatment process along with nitrogen removal, to an extent as to be acceptable for most applications requiring phosphorus removal. As compared to typical previous plant design for removing both phosphorus and nitrogen, far less tank volume is required, effecting a savings in square footage as well as cost, a savings that can be increased if a membrane separator is used in lieu of a clarifier. The aerobic stage can be contained in a relative small tank, with the volume ratio between the aerobic/anoxic stage and the aerobic stage being 1:1 or greater, even up to about 95:5. As compared to the known SymBio process, the invention additionally achieves phosphorus removal at relatively low additional cost.

Due to the reduction in aeration requirements with the inventive system, a reduction in off-gas production can result, and thus less odor emanates from a plant.

It is thus among the objects of the invention to achieve both nitrogen and phosphorus removal in the liquid side of a wastewater treatment plan, through an efficient use of two treatment stages, without the need for an anaerobic stage or tank as in the prior art. These and other objects, advantages and features of the invention will be apparent from the following description of a preferred embodiment, considered along with the accompanying drawings.

DESCRIPTION OF PREFERRED EMBODIMENTS

Figure 1:
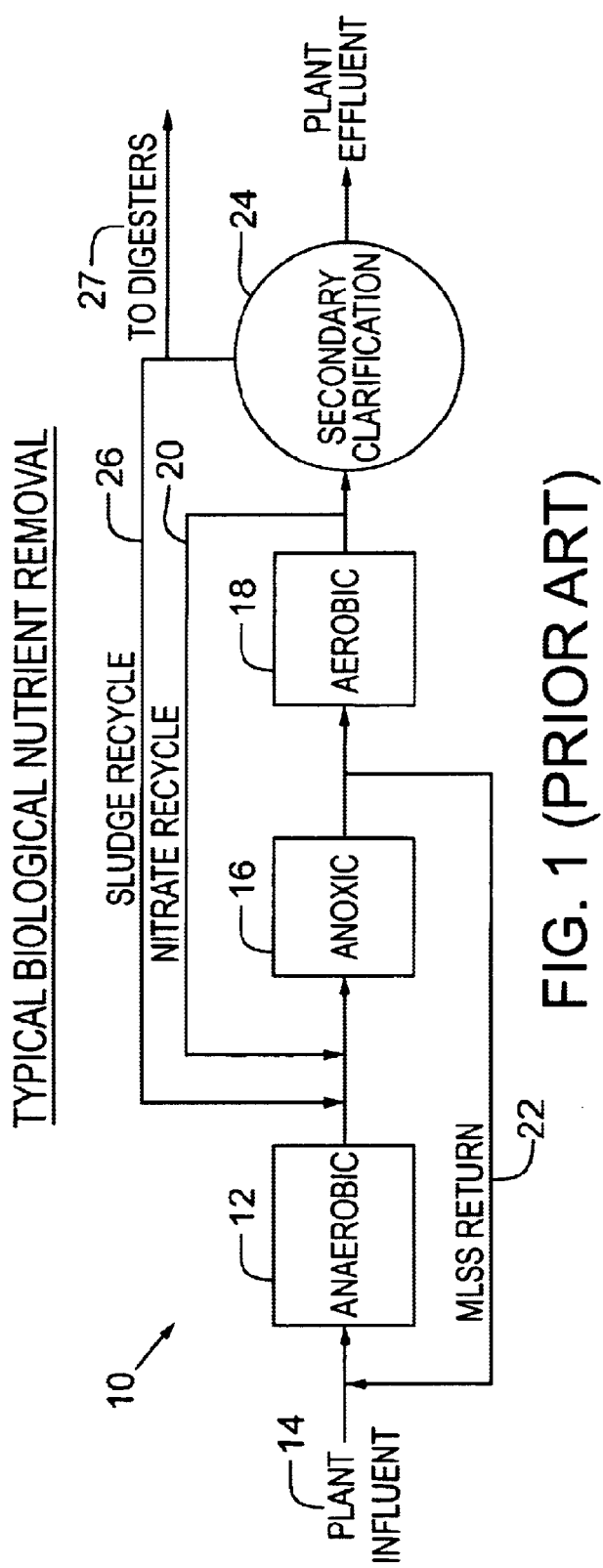
FIG. 1 is a schematic flow chart showing a typical prior art liquid-side process in a sewage treatment plant for nitrogen and phosphorus removal.

In the drawings, FIG. 1 shows a prior art liquid side system 10 for an activated sludge (AS) sewage treatment system, for the case where phosphorus removal as well as nitrogen removal is required. As shown, under such conventional systems biodegradation of nitrogen and phosphorus-containing material in such wastewater purification processes is carried out in three or more stages. Typically one stage is for phosphorus release under anaerobic conditions, with zero dissolved oxygen concentration, as indicated by the box 12 in FIG. 1, showing the anaerobic stage receiving plant influent 14. A second stage 16 is maintained under anoxic conditions, with essentially zero dissolved oxygen concentration but with presence of nitrate, downstream of the anaerobic stage 12, and a third stage 18 is maintained under aerobic conditions, with dissolved oxygen concentration normally greater than 1 ppm. Usually aqueous medium containing microorganisms, often referred to as "mixed liquor", is recycled from the aerobic stage 18 to the anoxic stage 16, as shown by the recycle loop line 20; and also from the anoxic stage 16 to the anaerobic stage 12, as indicated by the recycle loop line 22. The recycle at 20 provides nitrates for the anoxic stage, where microbes obtain oxygen from the nitrates in the zero dissolved oxygen conditions, causing release of nitrogen gas. The recycling at 22 retains adequate bacteria population in the anaerobic stage. Sludge is also shown as recycled at 26, from secondary clarification 24 to the anoxic stage 16, and this is also for the purpose of maintaining biomass in the system. Excessive sludge is periodically sent to the solids side of the plant, usually as a side stream from the recycle stream 26, indicated at 27 as going to digesters in FIG. 1. With phosphorus released into the water in the anaerobic stage 12, the phosphorus remains until the aerobic stage where enhanced phosphorus uptake by the microorganisms is effected. This is the desired result, that the biomass contain the phosphorus and it be removed from the liquid.

In such a conventional biological nutrient removal system, a typical volume ratio among the anaerobic, the anoxic and the aerobic stage is 20:20:60. Among the commercially marketed processes which use the principle are A/O, A²O, BARDENPHO, PHOSTRIP, PHOSTRIP II, DENITE, BIO-DENITRO, VIP, and BIONUTURE nutrient renewal processes.

Figure 2:
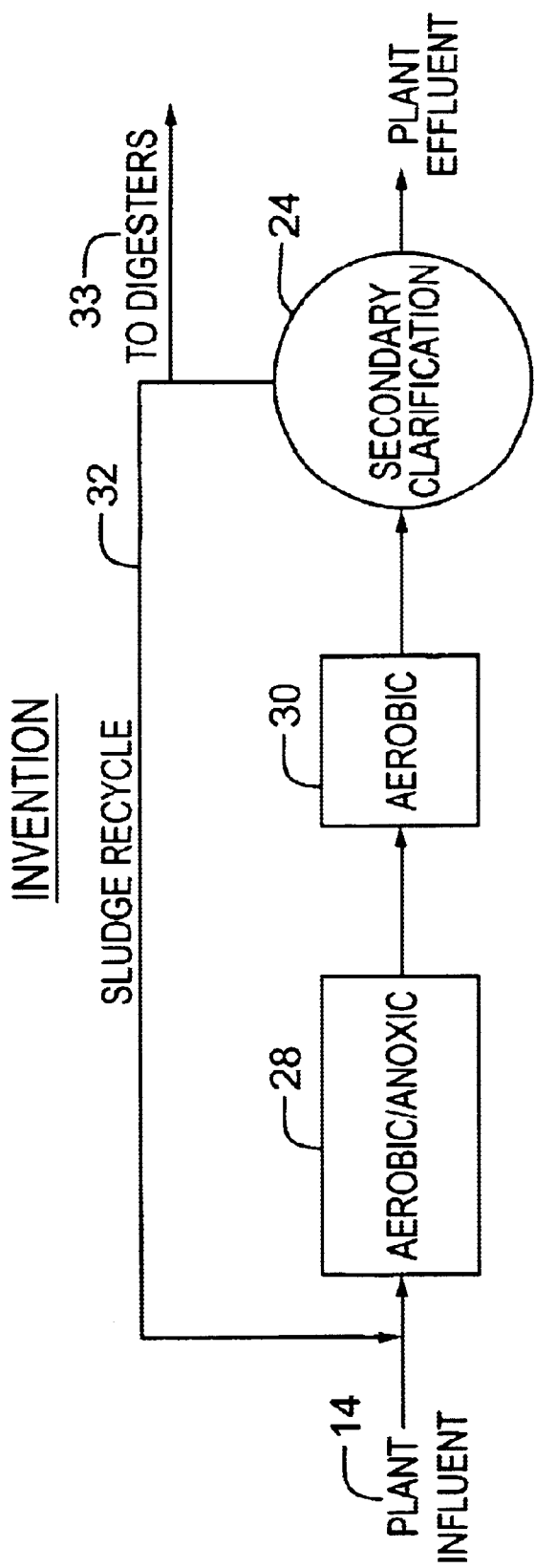
FIG. 2 is a schematic flow chart showing the process of the invention for effecting nitrogen and phosphorus removal in the liquid side of a sewage treatment plant.

The system of the invention is illustrated in the flow chart of FIG. 2. As explained above, this system comprises an expansion and improvement of the known SymBio process described in U.S. Pat. No. 5,906,746. By the novel process of the invention, the biodegradation of materials comprised of nitrogen and phosphorus-containing components is controlled such as to both release nitrogen gas and cause uptake of phosphorus by the microorganisms. The method includes only two stages, as shown in FIG. 2. Plant influent 14 is received in a first stage 28, which is an aerobic/anoxic stage. From this stage the wastewater proceeds to a small aerobic stage 30 as described above. As shown in the drawing, sludge can be recycled from downstream secondary clarification 24 to the aerobic/anoxic stage 28, as indicated by the recycle loop line 32. This helps retain adequate bacteria population. Excessive sludge is periodically sent to the solids side of the plant, usually as a side stream from the recycle stream 32, indicated at 33 as going to digesters in FIG. 2.

As noted above, in the first stage 28 the oxygen concentration is preferably maintained between about 0.01 and 0.99 ppm, varying as the process in this stage is controlled. In the second stage 30 the oxygen concentration is kept between about 0.5 and 5.0 ppm. As the schematic drawing shows, no recycling from the aerobic stage or zone to the aerobic/ anoxic stage or zone is needed in this process. This is also true of the SymBio process described above, which was not operated to remove phosphorus.

As in the SymBio process, the aerobic/anoxic stage is monitored as to metabolic activity of the microorganisms acting on the wastewater. Ultraviolet light is used in one implementation, to monitor a coenzyme produced by the microbes as they turn anaerobic. As nitrate is depleted, concentration of a certain coenzyme in the bacteria changes, and the coenzyme concentration is detectable via ultraviolet light. In the SymBio process, the aerobic/anoxic stage was immediately aerated to add dissolved oxygen when the development of anaerobic conditions was discovered in the middle of flocs within the tank. Allowing the condition to proceed to this point pursuant to the SymBio process assured that an anoxic condition would occur sufficient that the microbes act on nitrates in their need for oxygen, thus releasing nitrogen gas in this denitrification process. When tank aeration is increased, nitrification occurs, supplying more nitrate via the nitrogen compounds remaining within the stage. Subsequently, when the aeration is again limited to a sufficient extent (or shut off if desired), oxygen content is consumed and the microorganisms eventually enter again into the anoxic condition. Ultimately, sufficient nitrogen is removed to meet standards for the plant.

Pursuant to the invention, the development of the anaerobic condition inside the flocs in the aerobic/anoxic tank is allowed to proceed further, to the point that significant phosphorus is released into the water by the microbes, particularly those located within flocs. Subsequent re-aeration to higher dissolved oxygen levels then causes the microorganisms to take up the phosphorus, referred to as biological phosphorus uptake. Chemically, the polyphosphate accumulating microorganisms obtain the energy for transporting and storing the organic nutrients (e.g. PHB, polyhydroxybutyrate) from polyphosphate hydrolysis during the anaerobic period. This causes release of phosphorous into the water. Subsequently, the microorganisms replenish the polyphosphate using part of the energy derived from catabolism of the stored organic materials such as PHB during the aerobic period. This results in phosphorous uptake from the water.

In general, an optimum period of time for allowing the anaerobic condition to persist and develop in the floc is about five minutes after the UV detected signal indicates movement of bacteria to anaerobic inside the flocs. However, this period is adjustable based on conditions. The period will normally be at least about one minute, and can be much longer under some conditions. Instead of using a preselected time duration as an indicator for re-aerating, conditions can be monitored such that re-aeration is commenced only when the anaerobic condition reaches a certain stage. For example, percent change in the coenzyme concentration can be monitored for this purpose.

The controlled cycling of aeration in the aerobic/anoxic stage 28 is effective to cause some biological phosphorus uptake in this stage; however, as noted above this is generally not sufficient to cause uptake of all phosphorus released into the water during the occurrence of the anaerobic conditions in the tank. For this reason the small aerobic stage or zone 30 is provided downstream of the stage 28. This tank 30, which may be less than half the volume of the tank 28 (ratio of tanks 28 and 30 may be between 1:1 and 95:5), is provided to aerate the wastewater received from the zone or stage 28, to the extent that substantially all phosphorus released into the water is taken up by the microbes.

As a result of the invention, efficient and cost effective removal of nitrogen and phosphorus can be achieved, with small tank footprint, lower power requirements and less off-gassing odor, as noted above. In addition, experiments have indicated improved sedimentation properties of the mixed liquor and reduction in sludge production during subsequent wastewater purification processes. Further, it has been observed that the filamentous microorganism growth is suppressed. Excessive filamentous growth, common to biological nitrogen and phosphorous removal plants, can affect the settling characteristics negatively and cause problems in the subsequent clarification operation.

Figure 3:
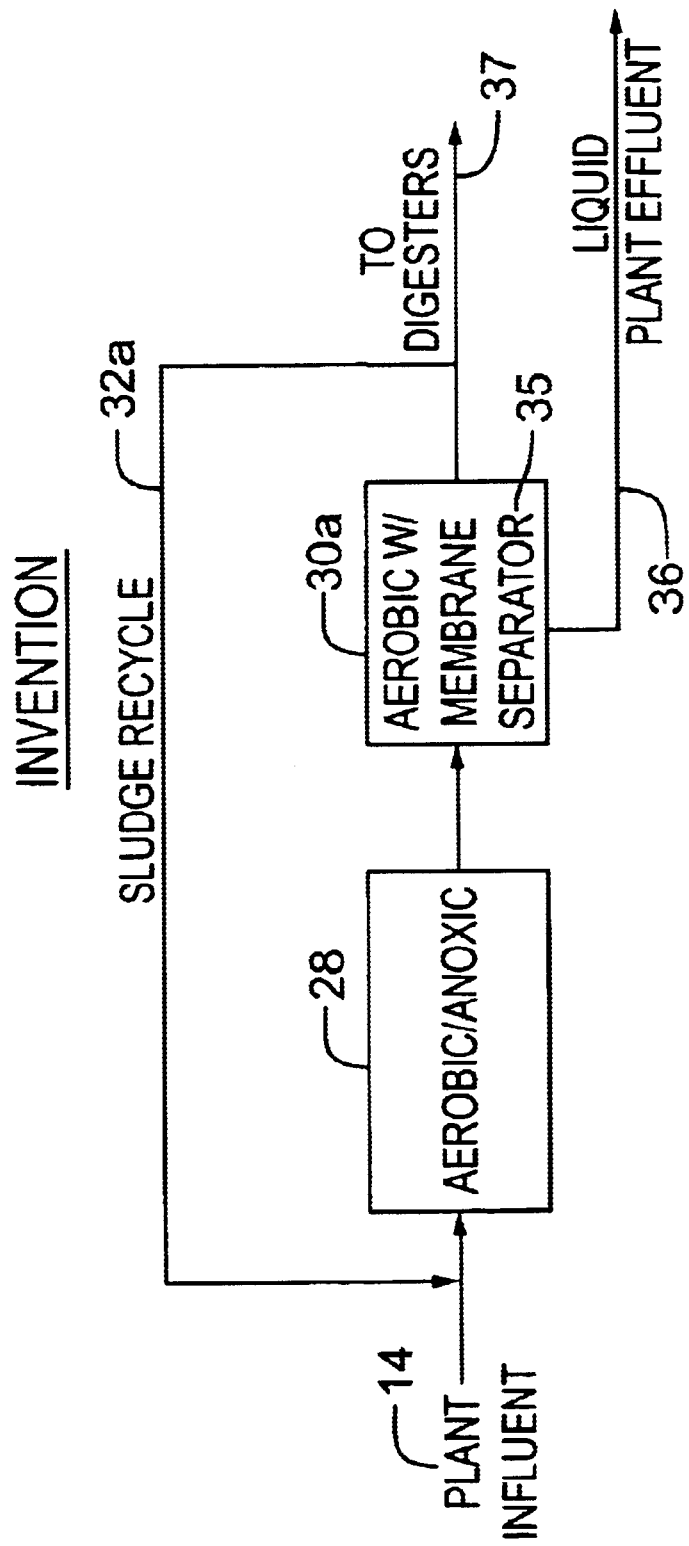
FIG. 3 is a schematic flow chart showing a modified process according to the invention, again for effecting nitrogen and phosphorus removal in the liquid side, with added feature of a membrane separator in an aerobic stage, eliminating the secondary clarification show in FIG. 2.

FIG. 3 shows a variation of the invention, in which the aerobic stage 30a includes a membrane separator indicated at 35. The membrane separator can replace a downstream clarifer, such as the secondary clarification 24 shown in FIG. 2. Such a membrane separator can comprise, for example, either flat plate type submerged filter membranes sold by Kubota of Japan or hollow fiber type submerged filter membranes sold by Zenon of Canada. Liquid is discharged as plant effluent at 36, separated out from the activated sludge by membranes within the aerobic stage 30a. The excess sludge is periodically sent to the solids side of the plant, indicated at 37 as going to digesters in FIG. 3.

As in the previously described embodiment, a recycle loop 32a is needed to maintain the necessary microbial population in the aerobic/anoxic stage 28.

Thus, FIG. 3 shows a system which greatly reduces tank volume-and cost, using a membrane separator within the aerobic stage, having the benefit of agitating the liquid and sludge at the membrane separator and thus tending to prevent clogging.

The invention permits various tank configurations, not only completely mixed continuous flow but also plug flow tanks, or oxidation ditches in a racetrack-like flow pattern, or sequential batch reactors, etc. Also the two stages/tanks 28 and 30 could be combined in a single tank using a partitioning wall, configured as a baffle or they can be created in two subsequent cycles separated by time in a single tank, in a sequential batch reactor, for example.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a sewage treatment plant and process having a liquid side in which nitrogen removal is effected, a method of operating the liquid side of the treatment process so as additionally to remove phosphorus, comprising:
    (a) maintaining an aerobic/anoxic zone receiving plant influent wastewater,
    (b) maintaining dissolved oxygen concentration in the aerobic/anoxic zone in a fluctuating range,
    (c) with dissolved oxygen concentration toward the lower end of said range and tending to promote denitrification, monitoring the status of bacteria in the aerobic/anoxic zone and detecting when bacteria near the centers of flocs turn anaerobic,
    (d) allowing the anaerobic condition to develop in the flocs to a preselected extent and thereby causing phosphorus to be released into the liquid, then adding dissolved oxygen to the aerobic/anoxic zone to effect recovery of at least some of the bacteria from the anaerobic condition and causing uptake of phosphorus, as well as effecting nitrification,
    (e) then limiting dissolved oxygen to the aerobic/anoxic zone to an extent to allow the bacteria to consume the dissolved oxygen,
    (f) repeating steps (c) through (e), and
    (g) moving effluent from the aerobic/anoxic zone to an aerobic zone in which dissolved oxygen concentration is maintained in a higher range sufficient to enhance biological phosphorus uptake,
    whereby nitrification, denitrification, phosphorus release and some biological phosphorus uptake occur in the aerobic/anoxic zone, and further nitrification and biological phosphorus uptake are enhanced in the aerobic zone.

2. The method of claim 1, wherein the anaerobic condition is allowed to develop in the flocs for a preselected period of time, said preselected period being at least about one minute.

3. The method of claim 2, wherein the preselected period of time is in the range of about one minute to about thirty minutes.

4. The method of claim 2, wherein the preselected period of time is about one minute to about five minutes.

5. The method of claim 1, wherein the range of dissolved oxygen concentration in the aerobic zone is about 0.5 to 5.0 ppm.

6. The method of claim 1, wherein the dissolved oxygen concentration maintained in the anoxic/aerobic zone is less than about 1.0 ppm.

7. The method of claim 1, wherein the range of dissolved oxygen concentration maintained in the anoxic/aerobic zone is about 0.01 to about 0.99 ppm.

8. The method of claim 1, wherein the aerobic/anoxic zone receives plant influent in a continuous flow, and wastewater flows from the aerobic/anoxic zone to the aerobic zone in a continuous flow.

9. The method of claim 1, wherein the aerobic/anoxic zone receives plant influent in a continuous flow, and wastewater flows from the aerobic/anoxic zone and from the aerobic zone to a secondary clarification zone in a continuous zone.

10. The method of claim 1, wherein the development of anaerobic condition is detected by chemical measurements of any of the following: ammonium, phosphate, nitrates and volatile fatty acid concentration, measurement of redox potential, pH, alkalinity short-term measurements of BOD, COD, measurement of $CO_2$ concentration or with measurement of fluorescence emission from at least one characteristic biogenic fluorophore selected from the group consisting of NADH, NAD(P)H, tryptophan—and tyrosine-containing proteins, tryptophan—and tyrosine-containing peptides, tryptophan—and tyrosine-containing derivatives of amino acids, purines, pyrimidines, nucleosides, nucleotides, nucleic acids, steroids and vitamins, and combination thereof.

11. The method of claim 1, further including using a membrane separator within the aerobic zone to separate out liquid from the wastewater, thus concentrating wastewater sludge within the aerobic zone.

12. The method of claim 11, further including recycling a portion of sludge leaving the aerobic zone, back to the aerobic/anoxic zone.

13. The method of claim 11, without secondary clarification downstream of the aerobic zone.

14. The method of claim 1, further including secondary clarification of wastewater sludge downstream of the aerobic zone, and recycling of a portion of sludge resulting from secondary clarification back to the aerobic/anoxic zone.

15. The method of claim 1, wherein in step (d) the anaerobic condition is allowed to develop until a coenzyme concentration characteristic of an anaerobic condition is detected as reaching a preselected percent change.

* * * * *